US008644563B2

(12) United States Patent
Akbarzadeh et al.

(10) Patent No.: US 8,644,563 B2
(45) Date of Patent: Feb. 4, 2014

(54) RECOGNITION OF FACES USING PRIOR BEHAVIOR

(75) Inventors: Amir Akbarzadeh, Bellevue, WA (US); Gang Hua, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 686 days.

(21) Appl. No.: 12/637,494

(22) Filed: Dec. 14, 2009

(65) Prior Publication Data
US 2011/0142299 A1 Jun. 16, 2011

(51) Int. Cl.
*G06K 9/00* (2006.01)

(52) U.S. Cl.
USPC .......................................... 382/118; 382/190

(58) Field of Classification Search
None
See application file for complete search history.

(56) References Cited

U.S. PATENT DOCUMENTS

| | | | |
|---|---|---|---|
| 7,103,211 B1 | 9/2006 | Medioni et al. | |
| 7,203,346 B2 | 4/2007 | Kim et al. | |
| 7,630,526 B2 | 12/2009 | Bober et al. | |
| 7,657,086 B2 | 2/2010 | Gu | |
| 7,747,045 B2 | 6/2010 | Chinen et al. | |
| 7,787,664 B2 | 8/2010 | Luo et al. | |
| 8,015,119 B2* | 9/2011 | Buyukkokten et al. | 705/319 |
| 8,284,990 B2* | 10/2012 | Ma et al. | 382/103 |
| 2004/0228528 A1 | 11/2004 | Lao | |
| 2005/0147280 A1 | 7/2005 | Yan et al. | |
| 2006/0050932 A1 | 3/2006 | Tumey et al. | |
| 2007/0183653 A1 | 8/2007 | Medioni et al. | |
| 2008/0080745 A1 | 4/2008 | Vanhoucke et al. | |
| 2008/0226174 A1 | 9/2008 | Hua et al. | |
| 2009/0022374 A1 | 1/2009 | Boult | |
| 2009/0060259 A1 | 3/2009 | Goncalves | |
| 2009/0060289 A1 | 3/2009 | Shah et al. | |
| 2009/0141950 A1 | 6/2009 | Ryu | |
| 2010/0014781 A1 | 1/2010 | Liu et al. | |
| 2010/0172551 A1* | 7/2010 | Gilley et al. | 382/118 |
| 2011/0038512 A1* | 2/2011 | Petrou et al. | 382/118 |
| 2011/0142298 A1 | 6/2011 | Akbarzadeh et al. | |
| 2011/0258556 A1* | 10/2011 | Kiciman et al. | 715/751 |

OTHER PUBLICATIONS

Gourier, et al., "Facial Features Detection Robust to Pose, Illumination and Identity", Retrieved at<<http://ieeexplore.ieee.org/stamp/stamp.jsp?tp=&arnumber=1398368&isnumber=30409>>, 2004 IEEE International Conference on Systems, Man and Cybernetics, pp. 617-622.

(Continued)

*Primary Examiner* — Samir Ahmed
(74) *Attorney, Agent, or Firm* — David Ream; James Ross; Micky Minhas

(57) ABSTRACT

Face recognition may be performed using a combination of visual analysis and social context. In one example, a web site such as a social networking site or photo-sharing site allows users to upload photos, and allows faces that appear in the photo to be tagged with users' names. When user A uploads a new photo, two analyses may be performed. First, a face in the photo is compared with known faces of users to determine similarity. Second, it is determined which other users user A frequently uploads photos of. Two probability distributions are created. One distribution assigns high probabilities to users whose photos are similar to the new photo. The other assigns high probabilities to users who frequently appear in photos uploaded by user A. These probability distributions are combined, and the person in the photo is identified as being the person with the highest probability.

20 Claims, 9 Drawing Sheets

(56) References Cited

OTHER PUBLICATIONS

Seo, et al., "Range Data Registration Using Photometric Features", Retrieved at<<http://ieeexplore.ieee.org/stamp/stamp.jsp?tp=&arnumber=1467571&isnumber=31473>>, Proceedings of the 2005 IEEE Computer Society Conference on Computer Vision and Pattern Recognition (CVPR'05), 6 pages.

Lin, et al., "Recognition-based Indoor Topological Navigation Using Robust Invariant Features", Retrieved at<<http://terpconnect.umd.edu/~zhelin/papers/90_ZheLin_IROS2005.pdf>>, 2005 IEEE/RSJ International Conference on Intelligent Robots and Systems, pp. 3975-3980.

Zhou, et al., "Probabilistic Recognition of Human Faces from Video", Retrieved at<<http://www.umiacs.umd.edu/~shaohua/papers/zhou03cviu.pdf>>, Feb. 11, 2003, pp. 214-245.

Chopra, et al., "Learning a Similarity Metric Discriminatively, with Application to Face Verification", Retrieved at<<http://yann.lecun.com/exdb/publis/pdf/chopra-05.pdf>>, IEEE Society on Computer Vision and Pattern Recognition 2005, dated: Jun. 20-25, 2006, 8 pages.

Ahonen, et al., "Face Recognition with Local Binary Patterns", Retrieved at<<http://www.springerlink.com/content/p5d9xp9gfkex5gk9/fulltext.pdf>>, ECCV 2004, LNCS 3021, dated: 2004, pp. 469-481.

Belhumeur, et al., "Eigenfaces vs. Fisherfaces: Recognition using Class Specific Linear Projection", Retrieved at<<http://www1.cs.columbia.edu/~belhumeur/journal/fisherface-pami97.pdf>>, IEEE Transactions on Pattern Analysis and Machine Intelligence, vol. 19, No. 7, Jul. 1997, 1997 IEEE, pp. 711-720.

Cai, et al., "Spectral Regression for Efficient Regularized Subspace Learning", Retrieved at<<http://www.cs.uiuc.edu/~hanj/pdf/iccv07_dengcai_SR.pdf>>, IEEE 11th International Conference on Computer Vision, 2007 (ICCV 2007), Oct. 14-21, 2007, 8 pages.

Cai, et al., "Orthogonal Laplacianfaces for Face Recognition", Retrieved at<<http://www.cs.uiuc.edu/~dengcai2/Publication/Journal/TIP-OLPP.pdf>>, IEEE Transactions on Image Processing, dated Nov. 2006, 19 pages, vol. 15, issue 11.

Cai, et al., "Learning a Spatially Smooth Subspace for Face Recognition", Retrieved at<<http://www.cs.uiuc.edu/~hanj/pdf/cvpr07_dengcai.pdf>>, IEEE Conference on Computer Vision and Pattern Recognition 2007 (CVPR '07), Jun. 17-22, 2007, 7 pages.

Gao, et al., "Face Recognition Using Line Edge Map", Retrieved at<<http://ieeexplore.ieee.org/stamp/stamp.jsp?tp=&arnumber=1008383&isnumber=21743>>, IEEE Transactions on Pattern Analysis and Machine Intelligence, Jun. 2002, pp. 764-779, vol. 24, Issue 6.

Georghiades, et al., "From Few to Many: Illumination Cone Models for Face Recognition under Variable Lighting and Pose", Retrieved at <<http://vision.ucsd.edu/kriegman-grp/papers/pami01.pdf>>, IEEE Trans. on Pattern Analysis and Machine Intelligence 2001, dated 2001, 35 pages, vol. 23, No. 6.

He, et al., "Face Recognition using Laplacianfaces", Retrieved at<<http://people.cs.uchicago.edu/~niyogi/papersps/Laplacianface.pdf>>, IEEE Transactions on Pattern Analysis and Machine Intelligence, Mar. 2005, pp. 1-34, vol. 27, issue 3.

Hua, et al., "Discriminant Embedding for Local Image Descriptors", Retrieved at<<http://www.ece.northwestern.edu/~ganghua/publication/ICCV07.pdf>>, IEEE 11th International Conference on Computer Vision, 2007 (ICCV 2007), Oct. 14-21, 2007, 8 pages.

Huang, et al., "LFW Results using a Combined Nowak Plus MERL Recognizer", Retrieved at <<http://vis-www.cs.umass.edu/papers/eccv2008-merlnowak.pdf>>, Faces in Real-Life Images Workshop in European Conference on Computer Vision (ECCV), 2008, pp. 1-2.

Huang, et al., "Labeled Faces in the Wild: A Database for Studying Face Recognition in Unconstrained Environments", Retrieved at<<http://www.tamaraberg.com/papers/Huang_eccv2008-lfw.pdf>>, University of Massachusetts, Amherst, Technical Report 07-49, 2007, pp. 1-14.

Liang, et al., "Face Alignment via Component based Discriminative Search", Retrieved at<<http://research.microsoft.com/en-us/um/people/jiansun/papers/ECCV08_FaceAlign.pdf>>, Proceedings of the 10th European Conference on Computer Vision: Part II, dated 2008, 14 pages, Springer-Verlag, Berlin.

Lowe David G., "Distinctive Image Features from Scale-Invariant Keypoints", Retrieved at<<http://www.caip.rutgers.edu/~meer/TEACHTOO/PAPERS/lowe04.pdf>>, International Journal of Computer Vision 60(2), 2004, pp. 91-110, Kluwer Academic Publishers, The Netherlands.

Lucey, et al., "Learning Patch Dependencies for Improved Pose Mismatched Face Verification", Retrieved at <<http://www.ri.cmu.edu/pub_files/pub4/lucey_simon_2006_1/lucey_simon_2006_1.pdf>>, 2006 IEEE Computer Society Conference on Computer Vision and Pattern Recognition—vol. 1 (CVPR'06), Jun. 17-22, 2006, 7 pages.

Luo, et al., "Person-Specific Sift Features for Face Recognition", Retrieved at<<http://ieeexplore.ieee.org/stamp/stamp.jsp?tp=&isnumber=&arnumber=4217478>>, 2007 IEEE, ICASSP 2007, pp. 593-596.

Moghaddam, et al., "Bayesian Face Recognition", Retrieved at<<http://www.cs.columbia.edu/~jebara/papers/TR2000-42.pdf>>, Appears in: Pattern Recognition, vol. 33, No. 11, Nov. 2000, 16 pages.

Nowak, et al., "Learning Visual Similarity Measures for Comparing Never Seen Objects", Retrieved at<<http://lear.inrialpes.fr/people/nowak/dwl/cvpr07.pdf>>, IEEE Conference on Computer Vision and Pattern Recognition, 2007 (CVPR '07), pp. 1-8.

Phillips, et al., "Overview of the Face Recognition Grand Challenge", Retrieved at<<http://www.nd.edu/~kwb/PhillipsEtAICVPR_2005.pdf>>, IEEE Computer Society Conference on Computer Vision and Pattern Recognition, 2005 (CVPR 2005), pp. 1-8.

Samaria, et al., "Parameterization of a Stochastic Model for Human Face Identification", Retrieved at<<http://ieeexploreieee.org/stamp/stamp.jsp?tp=&isnumber=&arnumber=341300>>, 1994 IEEE, pp. 138-142.

Sim, et al., "The CMU Pose, Illumination, and Expression Database", Retrieved at<<http://citeseerx.ist.psu.edu/viewdoc/download;jsessionid=CD0FA1DB61F739AE9DEC92A8A79857-1A?doi=10.1.1.13.7878&rep=rep1&type=url&i=0>>, IEEE Transactions on Pattern Analysis and Machine Intelligence, dated 2003, 9 pages, vol. 25.

Tola, et al., "A Fast Local Descriptor for Dense Matching", Retrieved at<<http://cvlab.epfl.ch/publications/publications/2008/TolaLF08.pdf>>, in Proceedings of IEEE Conference on Computer Vision and Pattern Recognition, 2008, 8 pages.

Turk, et al., "Face Recognition using Eigenfaces", Retrieved at<<http://www.cs.ucsb.edu/~mturk/Papers/mturk-CVPR91.pdf>>, 1991 IEEE, pp. 586-591.

Viola, et al., "Robust Real-Time Face Detection", Retrieved at<<http://www.vision.caltech.edu/html-files/EE148-2005-Spring/pprs/viola04ijcv.pdf>>, International Journal of Computer Vision 57(2), 2004, pp. 137-154.

Wang, et al., "Generalized Quotient Image", Retrieved at<<http://www.cbsr.ia.ac.cn/users/szli/papers/WHT-CVPR2004.pdf>>, in Proceedings of IEEE International Conference on Computer Vision and Pattern Recognition, 2004, pp. 1-8.

Winder, et al., "Learning Local Image Descriptors", Retrieved at<<http://people.cs.ubc.ca/~mbrown/papers/cvpr2007b.pdf>>, IEEE Conference on Computer Vision and Pattern Recognition, 2007 (CVPR '07), 8 pages.

Wiskott, et al., "Face Recognition by Elastic Bunch Graph Matching", Retrieved at<<http://www.face-rec.org/algorithms/EBGM/WisFelKrue99-FaceRecognition-JainBook.pdf>>, in Intelligent Biometric Techniques in Fingerprint and Face Recognition (eds. L.C. Jain et al.), dated 1999, pp. 1-23, Chapter 11, CRC Press.

Wolf, et al., "Descriptor based Methods in the Wild", Retrieved at<<http://www.openu.ac.il/home/hassner/projects/Patchlbp/WolfHassnerTaigman_ECCVW08.pdf>>, in Faces in Real-Life Images Workshop in European Conference on Computer Vision (ECCV) (2008), pp. 1-14.

Wright, et al., "Implicit Elastic Matching with Randomized Projections for Pose-Variant Face Recognition", Retrieved at http://www.ece.northwestern.edu/~ganghua/publication/CVPR09a.pdf>>,

(56) References Cited

OTHER PUBLICATIONS

IEEE Conference on Computer Vision and Pattern Recognition, 2009 (CVPR 2009), Jun. 20-25, 2009, 8 pages.

Zhang, et al., "Multiple-Instance Pruning for Learning Efficient Cascade Detectors", Retrieved at<<http://books.nips.cc/papers/files/nips20/NIPS2007_0575.pdf>>, NIPS 2007, Dec. 2007, pp. 1-8, Vancouver, Canada.

Gross, et. al., "Information Revelation and Privacy in Online Social Networks (The Facebook Case)", Retrieved at<<http://www.twine.com/_b/download/1138zj78w-4rv/
b0bsl79jx59rwtw7lr978psshbdk7tsxlb1w4wlpmfhprmt/
1138zj78w-4rv/
b05dtk7whd6v9wmty1t3vgx8zl0g1jr45t8m5gxyvfjc/infomraiton_revelation_and_privacy_in_onlibne_social_networking°252C_gross_and_aquisti.pdf>>, ACM Workshop on Privacy in the Electronic Society (WPES), Nov. 7, 2005.

Klein, Gabriel, "Networking People", Retrieved at<<http://www.nuage.ch/projets/networking/KleinGabriel-NetworkingPeople.pdf>>, dated: Sep. 30, 2004, pp. 1-56.

Huang, et al., "Beyond Memories: Weaving Photos into Personal Social Networks", Retrieved at<<http://people.ict.usc.edu/~pynadath/MOO-2006/huang.pdf>>, in Modeling Others from Observations: Papers from the 2006 AAAI Workshop, volume Technical Report WS-06-13. dated: 2006, 8 pages, The AAAI Press, Menlo Park, California.

Huang, et al., "Agent-Mediated Personal Photo Sharing", Retrieved at<<http://ntur.lib.ntu.edu.tw/bitstream/246246/154563/1/18.pdf>>, International Journal of Electronic Business Management, pp. 11-18, dated: 2007, vol. 5, No. 1.

Li, et al., "New Challenges in Multimedia Research for the Increasingly Connected and Fast Growing Digital Society", Retrieved at<<http://staff.science.uva.nl/~smeulder/pubs/MIR2007Li.pdf>>, MIR'07, Sep. 28-29, 2007, pp. 1-8, Augsburg, Germany.

Vivek, et al., "Robust Hausdorff distance measure for face recognition", in Pattern Recognition 40 (2007), pp. 431-442.

Takacs, Barnabas, "Comparing Face Images Using the Modified Hausdorff Distance", in Pattern Recognition, dated: 1998, pp. 1873-1881, Elsevier Science Ltd., Great Britain.

Hua, et al., "A Robust Elastic and Partial Matching Metric for Face Recognition", Twelfth IEEE Conference on Computer Vision 2009 (ICCV2009), 8 pages.

Office Action in U.S. Appl. No. 12/637,486 (U.S. Published Application No. 2011/0142298), text of Office Action plus lists of cited references, Sep. 7, 2012, 15 pages.

Notice of Allowance in U.S. Appl. No. 12/637,486, (U.S. Published Application No. 2011/0142298), text of Notice of Allowance and Notice of Allowability plus list of cited references, May 1, 2013, 9 pages.

* cited by examiner

US 8,644,563 B2

RECOGNITION OF FACES USING PRIOR BEHAVIOR

CROSS-REFERENCE

This application is related to U.S. patent application Ser. No. 12/637,486, entitled "Flexible Image Comparison and Face Matching Application," filed on the same date as this application.

BACKGROUND

There are various applications of face recognition. In general, a face recognition system compares a new image (the "candidate image") with an existing image of a known person's face (the "reference image"), and attempts to determine whether the candidate image is of the same person as the reference image. For a given database of reference images, it may be possible to take a new candidate image and determine which, if any, of the people in the database is shown in the new image.

One application of face recognition is to identify people in photos that are uploaded to social networking sites, photo-sharing sites, or similar types of services. This situation differs from the many other face recognition scenarios, since a social context exists that can help to infer the identity of people in the photos. In the general case of the face recognition problem, it might be assumed that the only thing that is known to help identify a face is how visually similar two face images are to each other, according to some comparison metric. However, in a social networking site, there tends to be a relatively small set of people of whom a given user tends to upload images. For example, a user might tend to upload images of his or her friends, or might tend to upload images of some subset of his or her friends (who can be identified from previously-uploaded photos). However, in many systems that allow users to be tagged in photos, this information is not used.

SUMMARY

Faces may be recognized in photos using a combination of visual face recognition techniques and social context. In one example, a web site (e.g., photo-sharing site, social networking site, etc.), allows users to upload photos and to tag people in the photos. The particular photos that a user has uploaded, and the particular people who appear in those photos, provides a context to understand which people might appear in future photos uploaded by that same user. For example, in photos that a given user has uploaded, 20 different people might be tagged, and 15 of those people might appear particularly frequently. One might make the assumption that people tend to upload images of the same people repeatedly. If so, then if that same user uploads a new photos that contains people, the probability that a person shown in the photo is among the 20 people identified is somewhat more likely than that the person shown in the photo will be just a random member of the population. And, among those 20 people, it is somewhat more likely that a person in the photo will be one of the 15 people who have appeared in that user's past uploads with the highest frequency than that the person would be one of the other 5 people who have appeared in the user's photos at a lower frequency. This information can be used to help to infer who is shown in a new photo that the user has uploaded.

When a user uploads a photo, a distance metric may be calculated between the person shown in the photo and other known users. The distance metric indicates how visually similar the face contained in the photo is to that of a known user. The larger the distance between the person in the new photo and the image of a known user, the less likely it is that the new photo contains an image of that user. Additionally—if the photo has been uploaded by some user (e.g., user A)—the fewer times that user A has uploaded an image of user B, the less likely it is that the new photo contains an image of user B. These two sets of facts can be used to determine the likely identity of a person shown in the photo. These two sets of facts may be combined to produce a probability distribution that represents—for each known user—the likelihood that that user is the person shown in the photo. The person in the photo may then be then identified as being the person whose probability value is the highest.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
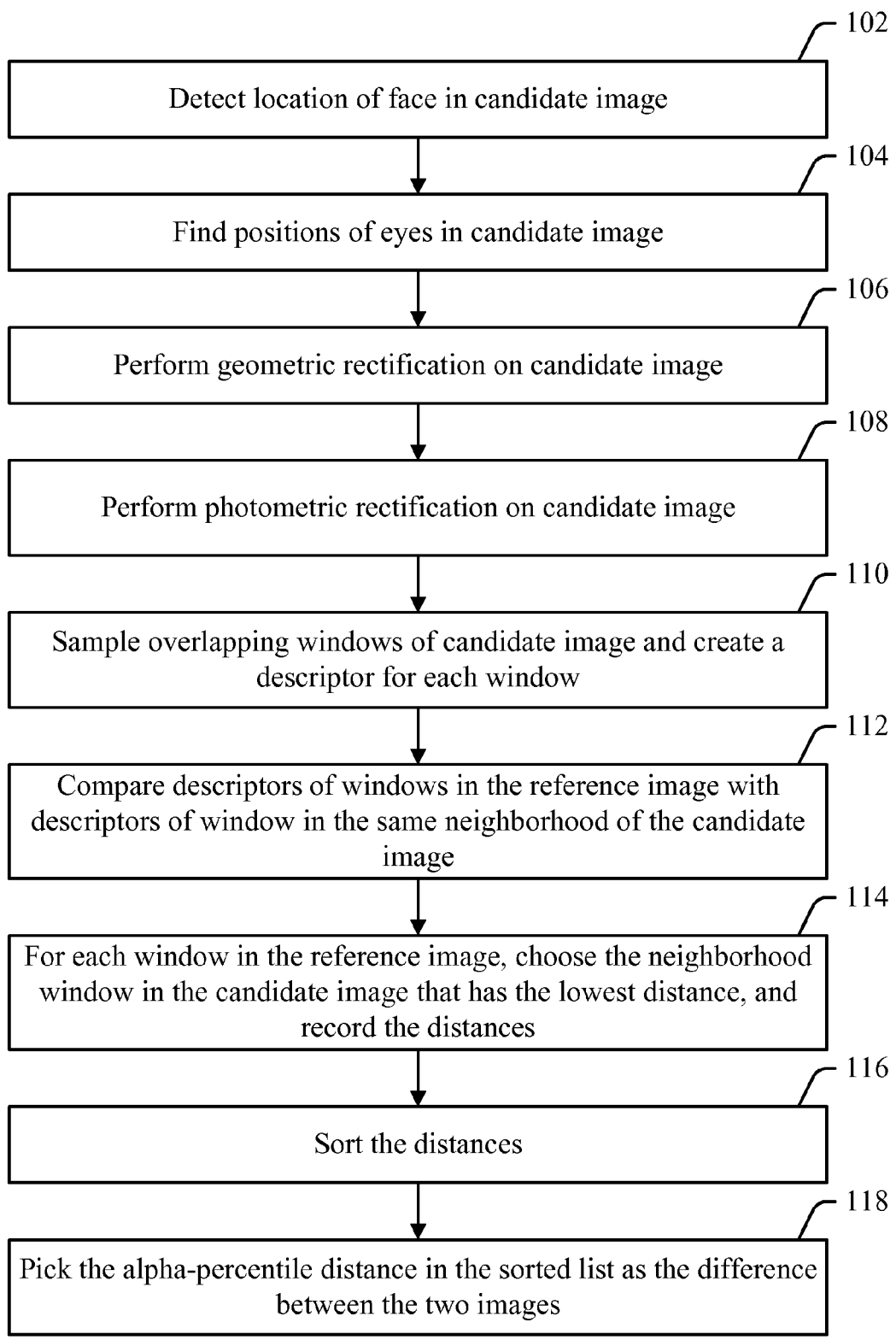
FIG. 1 is a flow diagram of an example process of comparing photos of two faces.

One application of a face recognition system is to identify people in photos, such as the type of candid photos that might be uploaded to a social networking site, photo-sharing site, or other type of service. People typically upload photos to such sites, and then manually tag the photos with the names of people who appear in the photos. A face recognition technique may be used to identify faces that appear in the photos, and to tag the photos automatically.

When one seeks to tag photos automatically in a social networking context, a few issues arise. First, the types of photos that are being uploaded may have all sorts of variations in angle, lighting, size, etc. Photos from passports and drivers licenses generally meet uniform standards, which makes such photos easy to compare. Candid photos may have variations that make them difficult to compare with each other, or with standardized photos. Thus, a face-matching algorithm, such as the one described below in connection with FIGS. 1-7, may be helpful in identifying faces that are harvested from candid photos. However, it is noted that the subject matter described herein may be used with any type of face-matching technique, and is not limited to the technique described above.

Second, in a social networking context, there is information—other than the appearance of the face itself—that can be used to help to identify the face. People generally invest effort in things that matter to them. Since taking and/or uploading a photo takes effort, people generally expend this effort on the relatively small number of people with whom they are close—e.g., spouses, children, parents, close friends, etc. While this group of people can change, it is likely to change relatively slowly and in small amounts. Thus, suppose that—of all the photos that person A uploads—there are five people (B, C, D, E, and F) who appear frequently in those photos. If person A then uploads a photo of a person to a social networking site and the automatic identifier of that site seeks to identify that person, it is reasonable to focus the inquiry on people B-F, rather than on the presumably large number of people who may have accounts on the site. Since A has previously uploaded photos of people B-F makes it somewhat likely that the new photo he has uploaded will contain one of those people. Of course, a visual comparison of the new photo with the known faces of people B-F might reveal that the new photo looks nothing like people B-F, in which case it makes sense for the automatic identifier to be willing to consider other people as being the correct identity of the face in the new photo. However, focusing the inquiry on people of whom A has uploaded photos in the past may be used to help identify a face—e.g., if the visual comparison with known faces does not strongly suggest the identity of the person in the photo.

Before turning to a description of how faces may be identified in a social networking context, we first describe an example face matching technique. The example face matching technique is described with reference to FIGS. 1-7. An example application that may use the face matching technique is then described with reference to the subsequent figures.

The subject matter described herein provides a way to compare images of faces. The techniques described herein may be used to recognize when two images show the same face, even when one or both of the images contain various kinds of differences. For example, one photo may have an occluded area while the other does not. The two photos may have different lighting. The photos may have been taken at different angles, or may show different facial expressions. When techniques herein are used to compare photos, it may be possible to recognize that two photos show the same person's face even if the photos have some or all of the above-mentioned differences, or other types of differences.

Techniques provided herein compare the faces in two images by separately comparing different regions of the image, and determining whether there are enough similar regions to conclude that the two images show the same person's face. The images to be compared are normalized in various ways. The rectangle that approximately bounds the face in an image is detected. This rectangle is extracted from the image, and magnified or demagnified to a particular size. Then the images are geometrically and photometrically rectified. Geometric rectification warps one image so that the position of the face in that image approximately matches the images of the face in the other image. Geometric rectification may be performed by detecting the positions of the eyes in the two faces, and warping one or both of the faces to change the positions of the eyes so that the eye positions match. This rectification tends to correct for pictures that were taken at oblique angles. Photometric rectification is also performed. In order to perform photometric rectification, two blurred versions of the image are calculated. The difference between the two blurred versions is then calculated, and the resulting different contains primarily the high-frequency information from the original image—i.e., the detail. Both images to be compared are rectified in this way, and then the comparison proceeds as follows.

A window that is smaller than the overall images to be compared is moved across those images. The different positions to which the window is moved may overlap with each other. For each window position, a descriptor of the visual material at that position is captured, resulting in a matrix that represents, for each image, the descriptors for various window positions. The descriptors of corresponding positions are then compared, and a distance is calculated for each window position. However, when the distance is calculated, a descriptor of one image is compared not only to the descriptor for the exact same position in the other image. Rather, the descriptor is also compared with descriptors from the neighborhood of that position—e.g., windows located a few pixels to the left, right, up, or down. So, for example, if the window at position (10,10) in the first image is being considered, the distance may be calculated between that window's descriptor and the descriptor for window (10,10), in the second image. However, window (10,10) in the first image may also be compared with nearby windows in the second image—e.g., window (8,10), window (8,12), and so on. Whichever window in the second image in that neighborhood has the smallest distance to the window being considered from the first image is taken to be the distance between the images at the location of that window. So, for example, if window (8,10) in the second image has the smallest distance to window (10,10), in the first image, then that distance is recorded as the distance between the two images at location (10,10). Such a distance is calculated for each location, resulting in a set of distances between the two windows for different locations. The distances may then be sorted from lowest to highest, and one of the distances is chosen to represent the difference between the two images. (In another example, a particular distance may be chosen without sorting the distances.)

The actual distance that is chosen to represent the image distance is based on a parameter, alpha. Alpha is a percentile that represents how far to the right in the sorted list the representative value will be chosen. For example, an alpha value of zero indicates that the left-most (i.e., smallest) value in the sorted list will be chosen to represent the difference between two images. In this case, if the images have even one similar window, then the images themselves will be deemed similar to each other. At the other extreme, an alpha value of 100% would choose the highest distance in the sorted list, so two images would be considered dissimilar to each other if they have even one dissimilar window. An alpha value somewhere between zero and 100% may be chosen, so that images could be considered similar to each other if they have a sufficient number of windows in common, without insisting that the images be similar everywhere. (Using an algorithm such as QuickSelect, the alpha-th percentile distance can be chosen without sorting the list.)

Turning now to the drawings, FIG. 1 shows an example process of comparing photos of two faces. In the process of FIG. 1, it is assumed that two images are being compared to determine whether they contain the same face. In the description of FIG. 1, one of these images is referred to as the "reference image," and the other is referred to as the "candidate image." Typically, the reference image is an image that has already been established to be an image of a particular person's face. The candidate image is typically an image that is being compared to the reference image to determine whether the candidate image is a picture of the same person as the reference image. However, the process described in FIG. 1 can be performed to compare any images.

At 102, the candidate image is examined to detect the location of a face in the image. For example, the image could be a photograph, of which a small portion is a face. Thus, at 102, the particular portion of the image that contains a face is identified.

At 104, the face in the candidate image is examined to identify the positions of the eyes. Identification of the eyes may be performed by any eye detection algorithm. The positions of the eyes are used to perform geometric rectification on the candidate image at 106. That is, the candidate image is resized and warped so that the eyes in the candidate image appear at the same position as the eyes in the reference image. Aligning the eyes in the candidate and reference image facilitates comparison between the two images.

At 108, photometric rectification is performed on the candidate image. In general, photometric rectification removes low frequency material from the candidate image. Removing low frequency material from the image corrects for certain lighting effects in the image, which facilitates comparison of images. An example technique for performing photometric rectification will be described below.

At 110, overlapping windows of the candidate image are sampled, and a descriptor is created for each window. For example, 4-pixel-by-4-pixel (4×4) squares of the candidate image could be evaluated, and a vector that describes each square could be created. The 4×4 pixel window could be moved both horizontally and vertically across the image one pixel at a time, so that the window will be evaluated—and a descriptor will be created—for every contiguous 4×4 pixels square within the candidate image. (Of course, the 4×4 window size is an example; any window size could be used). Similarly, windows of the reference image are evaluated, and descriptors are created for the reference windows.

At 112, descriptors of windows in the reference image are compared with descriptors of windows in the same neighborhood of the candidate image. For example, consider a window in the reference image whose uppermost, leftmost corner is pixel (i,j) in a rectangular coordinate system. (Since a specific corner of a square window defines the location of the window itself, such a window could be referred to as "window (i,j)".) A neighborhood could be defined as (i,j), plus or minus two pixels in all directions. Therefore, the window (i,j) in the reference image may be compared to all windows that are within two pixels of (i,j) in the candidate image. That is, window (i,j) in the reference image could be compared with all windows in column i−2 in the candidate image (i.e., (i−2, j−2), (i−2,j−1), . . . , (i−2,j+2)), then all windows in column i−1 in the candidate image ((i−1,j−2), (i−1,j−1), . . . , (i−1,j+2)), and so on through column i+2 (i.e., (i+2,j−2), (i+2,j−1), . . . , (i+2,j+2)).

A distance is then calculated between the descriptor for window (i,j) in the reference image and the descriptors for each of the corresponding neighborhood windows in the candidate image. Among those distances, the lowest distance is chosen, and that lowest distance is taken to be the distance between the reference image and the candidate image at window (i,j) (at 114). For example, suppose that window (i,j) in the reference image is compared to the set of neighborhood windows, described above, in the candidate image. Further suppose that, after all of those comparisons have been made, the window in the candidate image with the lowest distance to reference image window (i,j) is window (i−2,j+1). Then the distance between window (i,j) in the reference image and window (i−2,j+1) in the candidate image is recorded as being the distance between the two images at window (i,j).

In the manner described above, a distance between the reference and candidate image is found for each window. At 116, the set of distances is sorted. For example, the distances could be put in a line from lowest to highest.

At 118, the sorted list is examined, and the distance that lies at the alpha-th percentile in the sorted list is chosen as the distance between the reference image and the candidate image. Alpha is a parameter that is provided to control how many differences can be tolerated between two images while still allowing the images to be called similar to each other. Alpha is typically a value between zero and one. Since the distances between windows are sorted from lowest to highest, an alpha value of zero picks the zero-th percentile distance in this sorted list as the distance between two images—i.e., the smallest distance between any pair of corresponding windows in the images. In effect, therefore, an alpha value of zero implies that two images would be deemed to have a low distance between them if any portions of the two images are similar to each other. On the other end of the spectrum, an alpha value of one would pick the 99-th percentile distance in the sorted list—i.e., the largest distance between any pair of corresponding windows in the images. In effect, therefore, an alpha value of one implies that two images would be deemed to have a high distance between them if the images have any dissimilar spatial regions. An alpha value somewhere between zero and one would pick a distance somewhere in the middle of the list. In effect, such an alpha value would allow images to be deemed similar (i.e., to have a low distance between them) as long as they have several spatial regions that are similar to each other.

FIGS. 2-7 illustrate various aspects of the flow chart blocks described above. With reference to FIGS. 2-7, the following is a further description of some of the blocks in FIG. 1.

Figure 2:
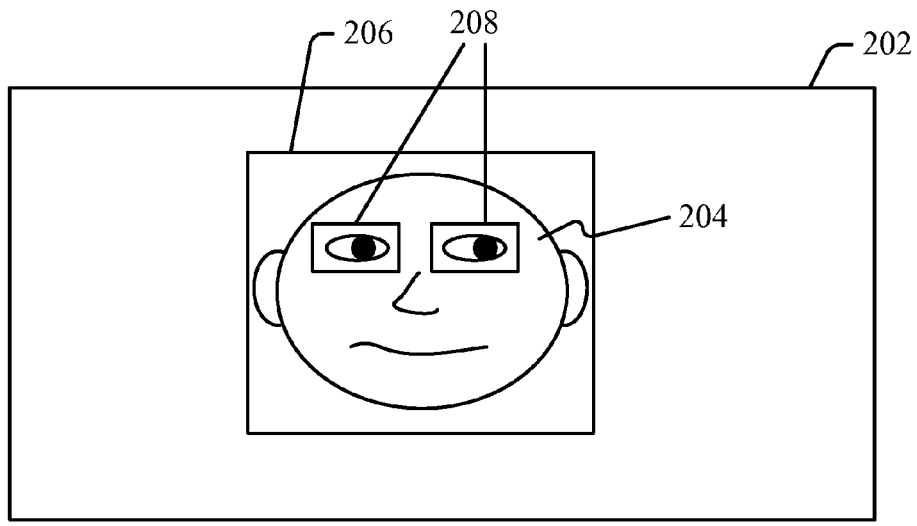
FIG. 2 is a block diagram of an image that contains a face, which illustrates aspects of face detection and eye detection.

FIG. 2 shows an image that contains a face, and illustrates how the location of the face and eyes are determined (blocks 102 and 104 of FIG. 1). Image 202 is any type of digital image, such as one that has been captured with a digital camera. As shown in the example of FIG. 2, face 204 may take up much of image 202. However, in another example, there could be many objects in image 202, in which case face 204 might take up a relatively small area of image 202. Since the process described in FIG. 1 may be used to compare faces harvested from any type of image, face detection is performed on image 202. There are various known face detection algorithms. Any of these algorithms (e.g., the Viola-Jones face detector) may be used to detect the location of face 204. In the example of FIG. 2, the face 204 contained in image 202 is roughly coextensive with rectangle 206. Thus, rectangle 206 identifies the location of face 204 in image 202.

Once the location of face 204 has been identified, eye detection may be performed on face 204. In the analysis of faces, eyes play a role since they can be used to orient and scale the geometry of a face. For example, it is true that a person's eyes are approximately the same width as each other, and are separated by a distance that is approximately equal to the width of each eye. It is also true that the corners of the eyes lie approximately in a horizontal line across the face. These features of the human face are examples of geometric facts that can be used to orient and scale the face, if the positions of the eyes are known. Thus, an eye detection algorithm is applied to face 204, and the algorithm may detect that the eyes are located in the positions indicated by rectangles 208.

Figure 3:
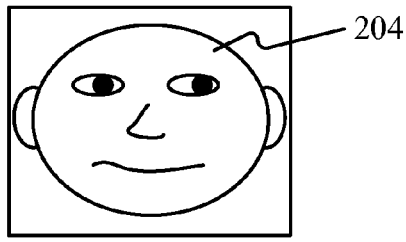
FIG. 3 is a block diagram of an image of a face, which illustrates aspects of geometric rectification.

FIG. 3 shows a normalized image of a face, following geometric rectification (block 106, FIG. 1). In order to compare images of two faces, the comparison is simplified if the images are the same size (i.e., if the images have the same number pixels in both the vertical and horizontal dimensions), and if the position and size of the face in each image has been made relatively consistent. As noted above, the process of FIG. 1 may be used to compare a candidate image with a reference image. Typically, the reference image has been normalized in some manner, and thus the candidate image is geometrically rectified to make its size and orientation more like that of the reference image. For example, the reference image might be a person's passport photo or driver's license photo, which has been created in such a manner that the position and size of the face in the photo conforms to certain metrics. However, the candidate image might be a candid photo. In such a candid candidate photo, therefore, the face might take up a small portion of the image, or might be at an angle. Therefore, geometric rectification attempts to normalize the size and orientation of the face in the image by enlarging or shrinking the image, and by warping the image, in such a manner that the eye positions of the face in the candidate image match (as closely as practical) the eye positions of the face in the reference image. FIG. 3 shows the same face 204 that is shown in FIG. 2, but it has been normalized to a standard size (as represented by the smaller image that appear in FIG. 3 as compared with FIG. 2). Although the difference between FIGS. 2 and 3 does not represent any warping of face 204, it is noted that geometric rectification may both warp and scale the image in order to cause the eye positions to match.

In addition to geometric rectification, photometric rectification may also be performed on the image (block 108, FIG. 1). Photometric rectification removes much of the low frequency material from an image, leaving only the detail in the image. At an intuitive level, removing the low frequency material from an image makes a photograph look more like a line drawing. High frequency material is generally associated with detail—e.g., the boundary between a face and the background, or the boundary between the eyes and the brow. Low frequency material, on the other hand, is typically associated with features such as shading or lighting. Since a face is defined by its detail, not by the light that was available when the image of the face was captured, removing the low frequency material allow the information that actually distinguishes one face from another to be compared across two images, without the distraction of lighting effects.

In order to perform photometric rectification, the face (e.g., the geometrically rectified face 204, shown in FIG. 3) is passed through a Difference of Gaussian (DoG) filter. That is, if one starts with an image $\mathcal{I}$, then the photometrically-rectified image $\hat{\mathcal{I}}$ is produced by applying two separate Gaussian blur kernels to the image to produce two different blurred images, and then subtracting one from the other. In other words, if $\mathcal{I}_{\sigma_1}$ and $\mathcal{I}_{\sigma_2}$ images created by applying Gaussian blur kernels with standard deviations of $\sigma_1$ and $\sigma_2$, respectively, to image $\mathcal{I}$, then $\hat{\mathcal{I}} = \mathcal{I}_{\sigma_1} - \mathcal{I}_{\sigma_2}$. In one example, $\sigma_1=0$ and $\sigma_2=1$. Intuitively, what happens in the photometric rectification process is that a version of an image that contains primarily low-frequency material (i.e., $\mathcal{I}_{\sigma_2}$), is subtracted from a version of an image that contains both low- and high-frequency material, (i.e., $\mathcal{I}_{\sigma_1}$), so the resulting difference (i.e., $\hat{\mathcal{I}}$) contains primarily high-frequency material. The reason this works is that $\mathcal{I}_{\sigma_1}$ is less blurred than $\mathcal{I}_{\sigma_2}$.

Once an image has been geometrically and photometrically rectified, overlapping windows of the reference and candidate images are evaluated, and a descriptor is assigned to each widow (block 110, FIG. 1). In order to partition an image into overlapping windows, a window size is first defined. In one example, the window size is a square of 18×18 pixels, although any size could be used. If the image to be evaluated has more than 18 pixels in the vertical and horizontal dimensions, then the 18×18 pixel window does not cover the entire image, so the image can be covered by shifting the window across and down the image, s pixels at a time. (In one example, s=2, although any value of s could be used.) For purposes of illustration, FIG. 4 shows an example in which a 3×3 pixel window is used, and an image is sampled by shifting this window, one pixel at a time, across and down the window.

Figure 4:
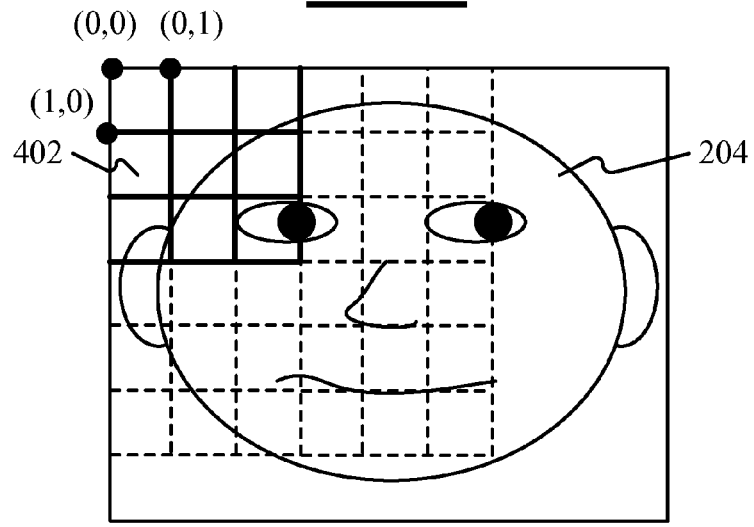
FIG. 4 is a block diagram of an image of a face, which illustrates aspects of sampling the image at overlapping windows.

The image shown in FIG. 4 contains face 204. Window 402 is show by the bold, solid cross-hatch pattern. Window 402 is a 3×3 pixel window, so each square in the bold cross-hatch pattern represents one pixel of the window. Initially, window 402 is placed at point (0,0). The choice of coordinates is arbitrary, but in one coordinate system, a pixel's location is defined based on how many pixels away it is from the uppermost, leftmost corner. Thus, the pixel that appear in the uppermost, leftmost corner is (0,0) (i.e., zero pixels lower than the uppermost row, and zero pixels to the right of the leftmost column). Since window 402 is of fixed size, the location of a window can be defined by the position of the window's uppermost, leftmost corner. Therefore, when window 402's uppermost, leftmost corner is at pixel (0,0), we may describe the window as being at (0,0), although it will be understood that, at this position, the window actually covers pixels (0,0), (0,1), (0,2), (1,0), (1,1), (1,2), (2,0), (2,1), and (2,2).

In order to sample the image shown in FIG. 4, window 402 is initially placed at point (0,0), and a descriptor is calculated for the image information that appears in that window. Any sort of descriptor may be used. In one example, the descriptor is a Winder-Brown descriptor, which accumulates four-dimensional histograms of rectified image gradients $\{|\nabla_x|-\nabla_x, |\nabla_x|+\nabla_x, |\nabla_y|-\nabla_y, |\nabla_y|+\nabla_y\}$, over nine spatial pooling regions. In general, the descriptor describes features of the portion of an image contained in a window. After this descriptor is calculated, window 402 is moved s pixels to the right. As noted above, in one example, an 18×18 window is used and s=2. In the example of FIG. 4, for purposes of illustration, s=1 so window 402 is shifted one pixel to the right. Thus, window 402 is moved to position (0,1) (with the first number in the order pair representing the row, and the second number representing the column), so that its right-hand boundary lies on the dotted line immediately to the right of the solid line, and a new descriptor is calculated for that location. As can be seen much of the material in the window at this position will overlap with the window's original position. The window is then successively moved one pixel to the right. After horizontal movement of window 402 across the image has been exhausted, the window is moved downward. For example, the window may be returned to the left side of the image, and then may be moved to the second row so that the window takes the position (1,0) (with the first number in the order pair representing the row, and the second number representing the column).

If the window is moved s pixels at a time, then assume that the number of different placements of the window in the horizontal dimension is K and that the number of placements in the vertical dimension is likewise K. Then, the result of the sampling process described above is a K×K matrix of descriptors. That is, if $\vec{f}_{mn}$ is the descriptor calculated from the window located at (m, n) then the matrix $F=[\vec{f}_{mn}]$, 1<m<K, 1<n<K contains all of the descriptors for all of the windows in an image. As noted above, the process of evaluating windows of an image may be carried out for both the candidate image and the reference image, resulting in a matrix for each image. In the description that follows these two matrices may be referred to as $F^{(1)}$ and $F^{(2)}$.

In order to determine the difference between two images, the descriptors of the two images are compared pairwise to calculate distances between corresponding descriptors. However, since the different parts of two images might not correspond exactly, some "play" is allowed in the comparison. For example, suppose that we are trying to determine the distance between the descriptors for window (4,4) in two images. We may start by looking descriptor $\vec{f}_{44}$ in the matrix for the reference image (matrix $F^{(1)}$). Using a distance metric, it is possible to calculate the distance between that descriptor and the corresponding $\vec{f}_{44}$ descriptor in the matrix for the candidate image (matrix $F^{(2)}$). However, it is possible that $\vec{f}_{44}$ in matrix $F^{(2)}$ might not be the relevant comparison with $\vec{f}_{44}$ in matrix $F^{(1)}$. Suppose, for example, window (4,4) in the reference image has the right corner of a person's mouth exactly at its center. It is possible that window (4,4) in the candidate image also has the right corner of a person's mouth exactly at its center, but it is also possible that the right corner of the mouth in the candidate image is actually in the center of some other window—e.g., window (3,3), window (4,2), etc. Assuming that the right corner of the mouth is not occluded in the candidate image, it is likely that the corner appears in the center of some window that is near window (4,4), but that window might not be window (4,4) itself. Therefore, in comparing two images, a descriptor for a window in one image is compared with the descriptor for that same window in the other image, and also with descriptors for nearby windows. For example, we might consider windows that are up to four pixels away in the vertical or horizontal dimensions. A comparison of a window of one image with windows in the same neighborhood of another image is the type of comparison described in blocks 112 and 114 of FIG. 1. An example of such a comparison is shown in FIG. 5.

Figure 5:
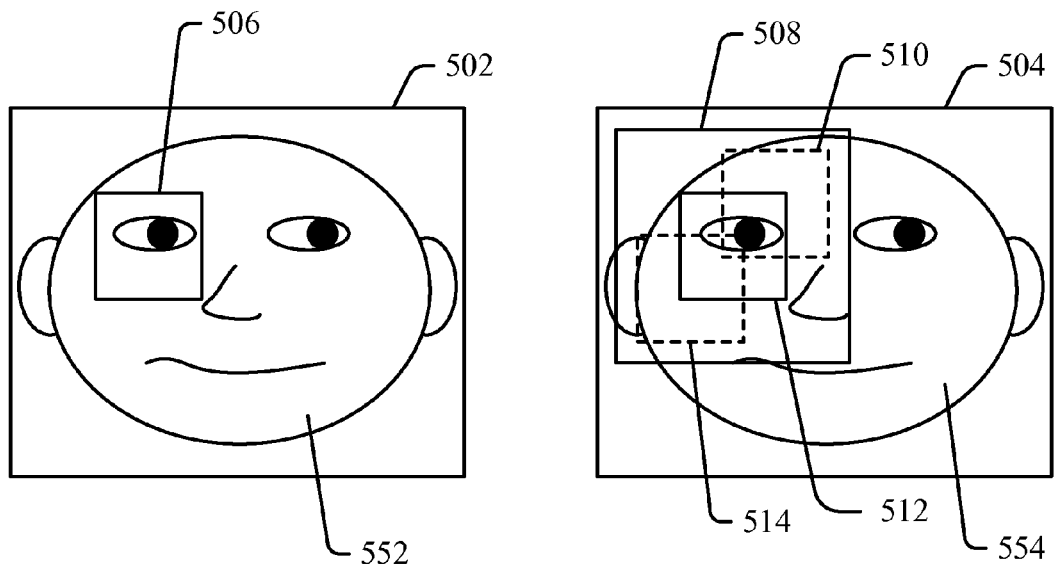
FIG. 5 is a block diagram of a reference image and a candidate image, which illustrates aspects of neighborhood comparison of windows.

In FIG. 5, the two images to be compared are images 502 and 504. Image 502 contains face 552, and image 504 contains face 554. (In one example, images 502 and 504 are being compared to determine whether the respective faces that they contain are of the same person.)

Window 506 is a window of image 502. For example, window 506 might be located at a location (i,j) within image 502. Window 512 is a window of image 504. Window 512 is located at location (i,j) in image 504. In other words, windows 506 and 512 are at the same spatial position within their respective images. The descriptor for window 506 is compared with the descriptor for window 512. However, the descriptor for window 506 is also compared with the descriptors for windows in the neighborhood 508 of window 512. As shown in FIG. 5, neighborhood 508 has window 512 roughly at its center. However, neighborhood 508 also contains windows 510 and 514 (as well as, possibly, other windows, not shown). Window 506 is also compared to windows 510 and 514 (and, possibly, to the other unshown windows in neighborhood 508). Whichever window in neighborhood 508 has a descriptor with the lowest distance to the descriptor of window 506 is retained as the distance between the two images at location (i,j). It is noted that whichever window in neighborhood 508 has the greatest similarity to window 506 (as determined by finding the lowest distance between window descriptors) is taken to be the distance between the two images at location (i,j) even though the window in neighborhood 508 that produces this lowest distance might not actually be located at (i,j). Since a goal of the process of FIG. 1 is to find out whether the faces in two images contain similar features, the process of comparing a window in one image with several windows in a neighborhood in the other image—rather than merely comparing windows at the exact same spatial location—means that similar facial features in two images might be recognized even if these features do not appear in exactly the same place.

In formal language, these ideas can be expressed as follows. For each window in a first image, a distance is calculated, which represents how different that is from windows that are in about the same location in a second image. For a given window, identified by position (i,j), that distance can be expressed as $d(\vec{f}_{ij}^{(1)})$. As will be recalled, a descriptor is calculated for each window, so the "distance" is a measure of how different the two descriptors are (which represents how different the visual information contained in the windows is).

For a given location (i,j), $d(\vec{f}_{ij}^{(1)})$ is the minimum distance between the descriptor for window (i,j) in the first image, and windows in the neighborhood of (i,j) in the second image. Thus, it can be said that $$d(\vec{f}_{ij}^{(1)}) = \min_{k,l:|i\cdot s-k\cdot s|\leq r,\ |j\cdot s-l\cdot s|\leq r} \left\| \vec{f}_{ij}^{(1)} - \vec{f}_{kl}^{(2)} \right\|$$

Or, in other words, window (i,j) in the first image is compared with all windows (k,l) in the second image such that (k,l) is no more than r pixels away from (i,j) in the vertical and horizontal directions. (It will be recalled that s is a parameter that determines how many pixels apart the windows are from each other.) In one example, the neighborhood comparison considers windows that are up to four pixels away in any direction from (i,j). In such a case, neighborhood 508 is defined by the rectangle whose corners are (i−4,j−4), (i−4,j+4), (i+4,j−4), and (i+4,j+4).

Figure 6:
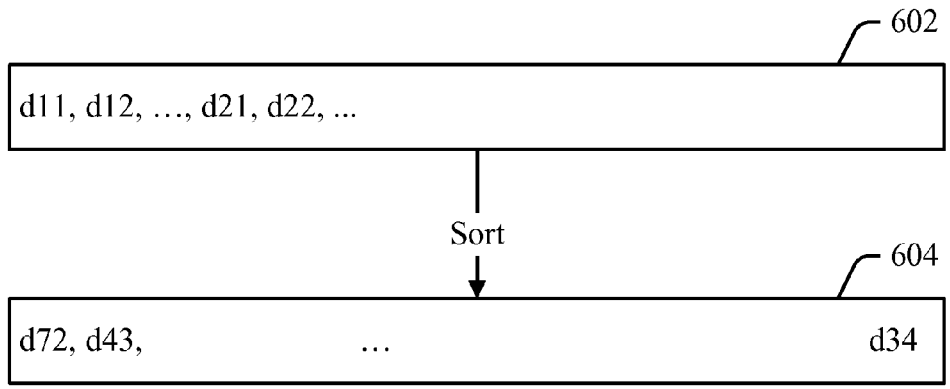
FIG. 6 is a block diagram of a list of distances, and of the sorting of that list.

After all of the distances $\vec{f}_{ij}^{(1)}$ have been calculated, what results is a set of distances, $d_{ij}$, where the set contains one distance for each window position. These distances can be sorted, as described in block 116 of FIG. 1. FIG. 6 shows an example in which distances are sorted.

Distances 602 are a set of distances that appear in the order in which the windows are numbered in an image. Thus, in distances 602, the distances appear in the order $d_{11}, d_{12}, \ldots, d_{21}, d_{22}, \ldots$ Distances 602 are sorted by value from lowest to highest, thereby producing sorted distances 604. For example, if the smallest distance in distances 602 is distance $d_{72}$, then $d_{72}$ appears first in sorted distances 604. If distance $d_{43}$ is the second smallest distance in distances 602, then distance $d_{43}$ appears second in sorted distances 604. And so on, so that sorted distances 604 contains the same list of distances that appear in distances 602, but in sorted order.

Figure 7:
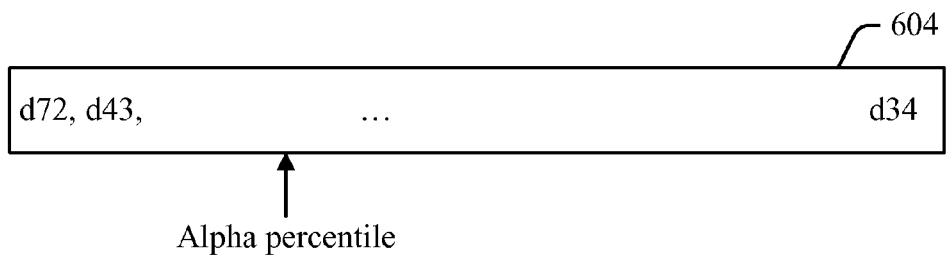
FIG. 7 is a block diagram of a sorted list of distances, and the choice of an alpha-th percentile element of that list.

Once the distances between windows have been sorted, one of these distances is picked to represent the distance between the two images, as described above in block 118 of FIG. 1. The picking of a distance is shown in FIG. 7. As can be seen in FIG. 7, the alpha-th percentile distance (or, rather, a distance that appears nearest to alpha percent along the sorted list from left to right) is picked to represent the distance between the two images. Alpha may be represented as a value between zero and one (or zero and one-hundred, or on some other scale). In the examples that follow, it will be assumed that alpha is represented on a scale of zero to one. At one extreme, where alpha is zero, the lowest distance among sorted distances 604 is used to represent the distance between two images. In effect, when alpha is zero, the distance between two images is the distance between their most similar windows. Thus, if two images have any windows that are relatively similar to each other, then the distances between the images would be small—even if the images have many dissimilar windows. At the other extreme, where alpha is one, the distance between two images is highest distance among distances 604. In this case, if the two images differ significantly at any window, then a distance would be chosen that indicates the images are quite different. Thus, when alpha is one, two images would be found to be similar only if they are similar everywhere. In one example, alpha is chosen so that images that have some features in common would be found to be similar, while images that are by-and-large different from each other would be recognized as being different. In other words, alpha is chosen such that two images will be called similar even if they have some windows that are quite different from each other, as long as some proportion of the windows are similar. For example, suppose that alpha is set at 0.2 (or 20%). Then, the distance between the windows is chosen as the value that appears roughly one-fifth of the way from the lowest to highest value in sorted distances 604. If at least 20% of the windows in the two images are similar to each other, then the distance chosen will indicate that the images are quite similar to each other. On the other hand, if only 10% of the windows are similar across images, then the low distances in the sorted list of distance will occupy only the left 10% of the sorted list, so the distance that lies 20% across that list will be a high distance. That high distance would be chosen to represent the difference between the two images, which would be appropriate if the images have very few windows that are similar to each other. Note that there are other methods of selecting the alpha-th percentile distance, which could be used. One such method is QuickSelect. QuickSelect could be used to select the alpha-th percentile distance without sorting. In general, any technique may be used to select the alpha-th percentile distance, and the subject matter herein is not limited to any particular technique.

Figure 8:
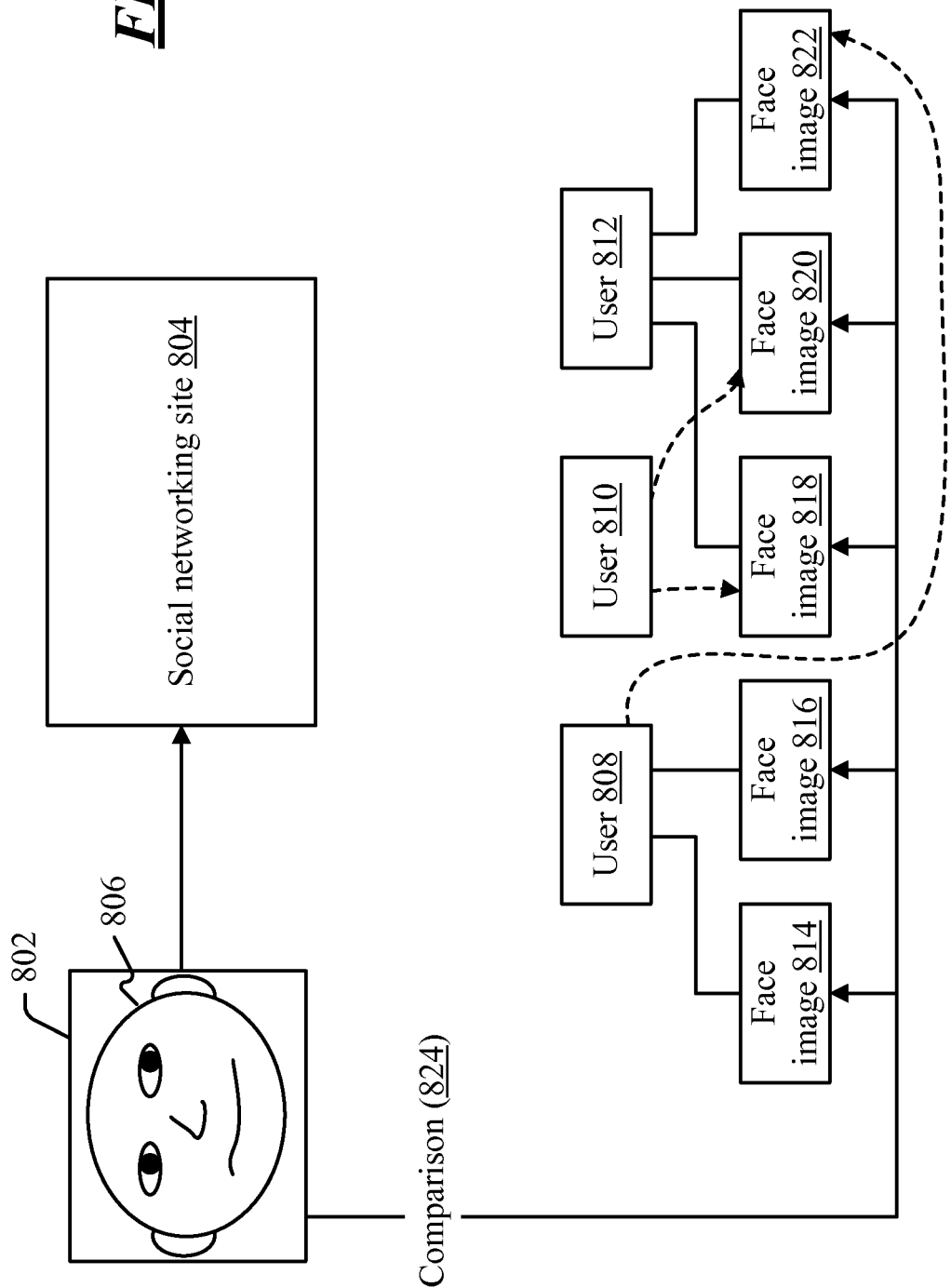
FIG. 8 is a block diagram of an example system in which face identification may be performed.

FIG. 8 shows an example system in which face identification may be performed. In the example of FIG. 8, an image 802 is uploaded to a social networking site 804, and image 802 includes a face 806. It is noted that the techniques described herein are not limited to social networking sites (or to any particular kind of service). However, for the purpose of illustration, the examples herein demonstrate the use of a photo identification technique with a social networking site.

Social networking site 804 has a plurality of users. For purposes of illustration, there are three users 808, 810, and 812 shown in the figure, although a real social networking site would likely have millions of users. User 808 has two face images 814 and 816 associated with that user (as indicated by the solid lines connecting user 808 with face images 814 and 816). To say that user 808 is associated with face images 814 and 816 means that these two images exist in social networking site 804, and these images have previously been determined to be images of user 808. The determination that face images 814 and 816 are images of user 808 may have been done with perfect certainty (e.g., user 808 may have personally identified the images as being images of himself), or may have been done up to some less-than-perfect level of certainty (e.g., an algorithm may have been used to determine that the images belong to user 808, and the system may be able to tolerate some level of positive probability that the determination is wrong). Regardless of the method and/or level of certainty with which the determination is made that face images 814 and 816 are images of user 808, to say that face images 814 and 816 are associated with user 808 means, in this example, that social networking site 804 will behave as if face images 814 and 816 belong to user 808. Likewise, user 812 is associated with face images 818, 820, and 822. User 810 is not associated with any face images. That is, in this example, it is assumed that user 810 exists on the social networking site, but that there is no image of user 810 known to the social networking site. (The lack of such an image may occur, for example, if the user is new to a site or has few friends on the site.)

The dotted lines in FIG. 8 indicate who has uploaded the various face images. For example, user 810 has uploaded two images of user 812—i.e., face image 818 and face image 820 (as indicated by the dotted lines leading from user 810 to those images). Additionally, user 810 has uploaded one image of user 808 (i.e., face image 816). Thus, if these are the only three images that user 810 has uploaded in the past, then—if user 810 uploads a new image at some point in the future—an automatic face identifier may take into account that user 810 has a history of uploading images of users 808 and 812, and that user 810 is, historically speaking, about twice as likely to upload an image of user 808 as he is to upload an image of user 812. (With three images being the only available data concerning user 810's upload patterns, the confidence with which this latter statement can be made is relatively weak. But it can easily be understood from this simple example how a probability distribution could be constructed from a larger number of data points, where the probability distribution would represent user 810's historical probability of uploading a photo of some particular user.)

Thus, FIG. 8 shows how a social networking site may keep track of which faces are images of which users, and may also keep track of which users have uploaded those faces. The fact that a first user has uploaded the face of a second user in the past makes it somewhat more likely that a future face that the first user uploads will be an image of that second user. However, an automatic face identifier may consider information beyond users' historical upload behavior. Additionally, such a face identifier may make a comparison 824 between image 802 of the new face 806 and the existing face images 814-822. This comparison may be made using a face-matching algorithm (of which the technique described above in connection with FIGS. 1-7 is merely one example, since any face matching technique could be used).

Figure 9:
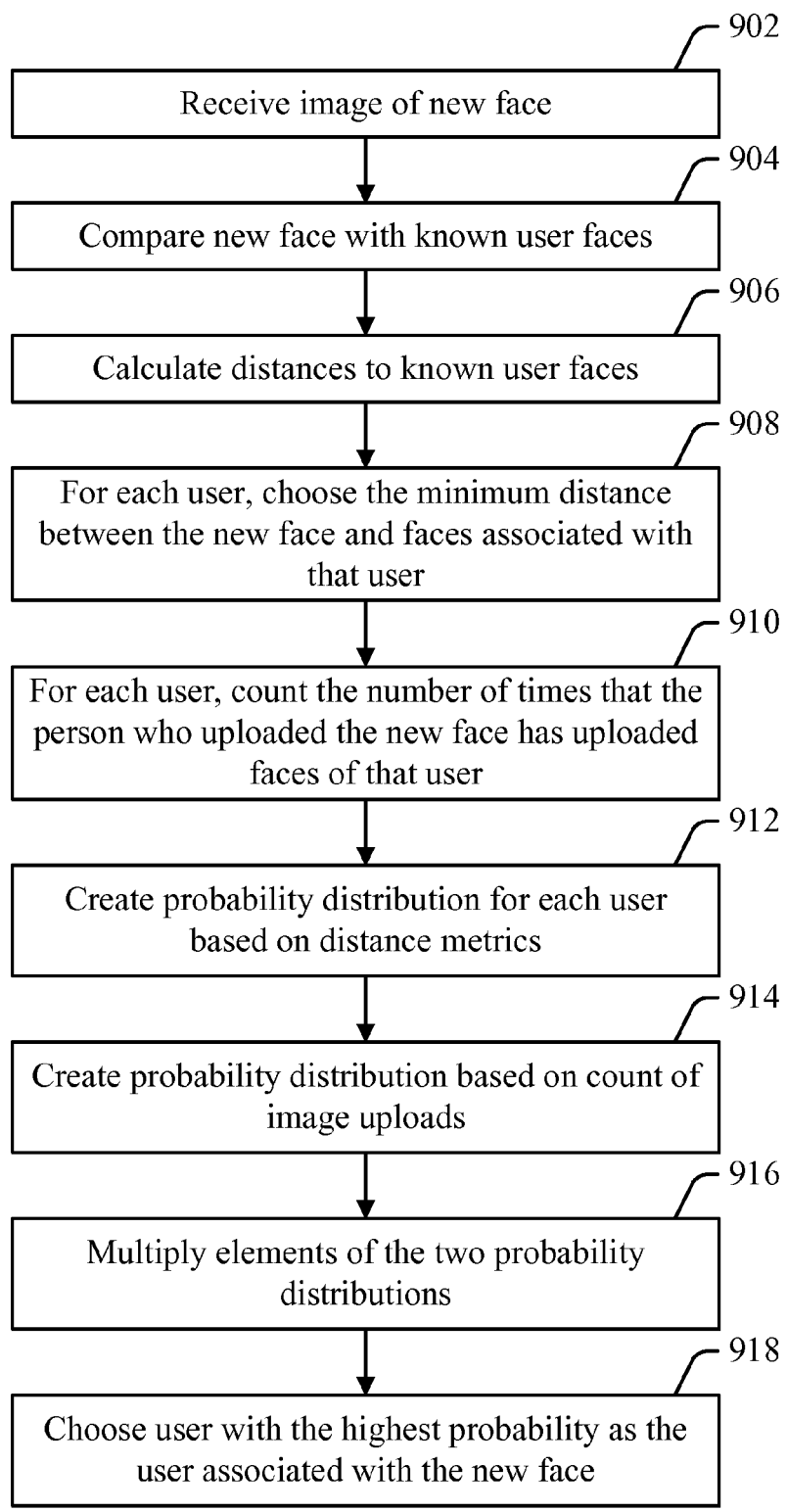
FIG. 9 is a flow diagram of an example process in which an image of a new face may be received and identified.
Figure 10:
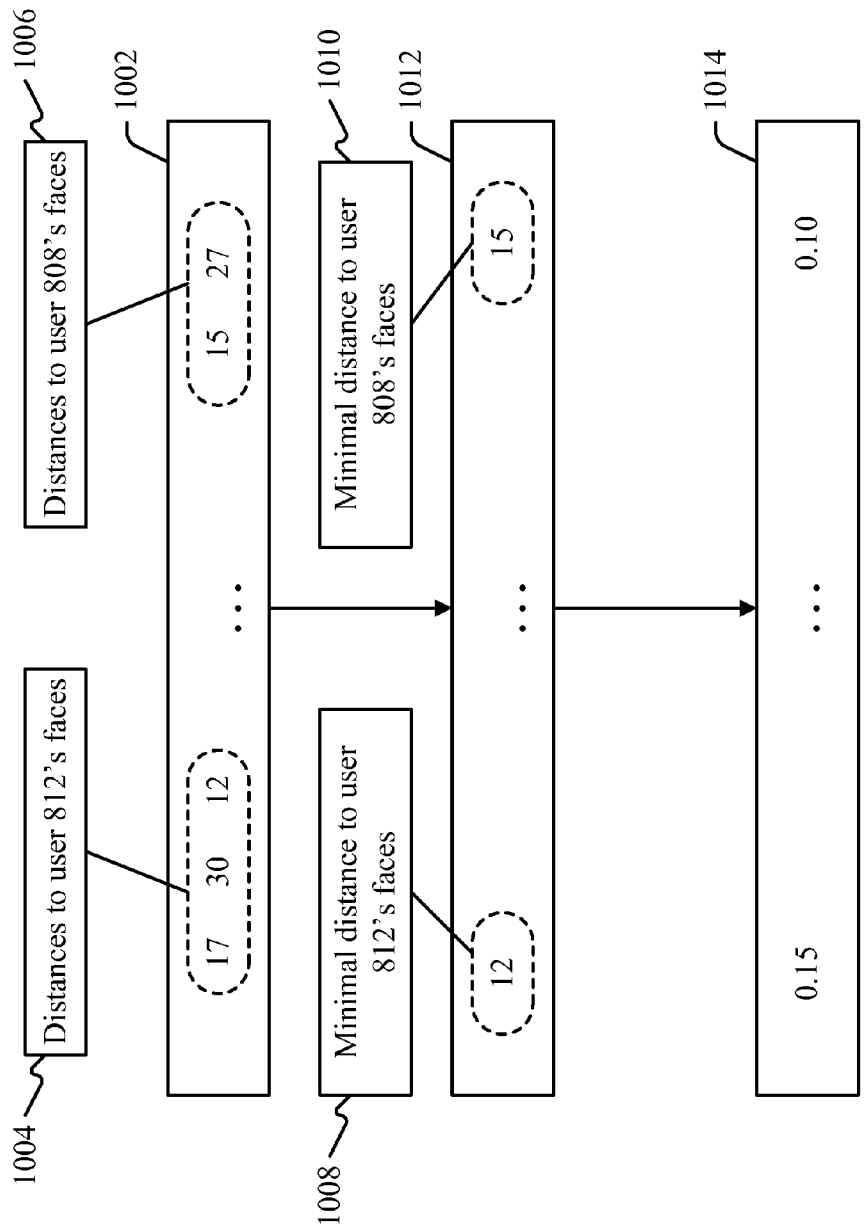
FIGS. 10-12 are block diagrams of example data and calculations that may be used in the process of FIG. 9.

FIG. 9 shows an example process in which an image of a new face may be received and identified. FIG. 9 is described with respect to the flowchart of FIG. 9, and also with reference to the block diagrams in FIGS. 8 and 10-12. It will be understood that, in the description that follows, elements from any of FIGS. 8-12 may be used.

At 902, an image of a new face is received. In the examples that follow, it is assumed that the image was uploaded by user 810 (shown in FIG. 8). At 904, the image is compared with a set of images of known user faces. For example, with reference to FIG. 8, face 806 in new image 802 may be compared with face images 814-822. The distances between the new face and the known faces may be calculated using some metric (at 906). The metric indicates how different the new face is from the existing images. The technique described above in connection with FIGS. 1-7 is one way to make this comparison, although any appropriate technique could be used to compare images of faces, and to calculate a distance between the images. As noted above, each of face images 814-822 has previously been determined to be the face of a particular user. Thus, the distance between new face 806 and face images 814-822 represents a measure of how unlikely it is that the new face is a picture of one of the users associated with face images 814-822. For example, if the distance between new face 806 and face image 814 is 10 and the distance between new face 806 and face image 818 is 20, then it is more likely that face 206 is the face of user 808 than the face of user 812, since face 206 would have been judged to be more similar to the face of user 808 than to the face of user 812.

After the distance between face 806 and each of the face images has been calculated, the minimum distance for each user is calculated (at 908). For example (again with reference to FIG. 8), face images 814 and 816 are images of user 808, and face images 818, 820, and 822 are images of user 812. A distance may be calculated for each face image, but some of these face images are known to be of the same user. One of these distances may be chosen to represent the overall distance between face 806 and user 808, and another distance may be chosen to represent the overall distance between face 806 and user 812. Any technique may be used to choose a distance that will represent the distance between new face 806 and a particular user. For example, an average distance could be used, so that the difference between face 806 and user 808 would be the average of the two distances between face 806 and face images 814 and 816, respectively. However, one way to choose a representative distance (as shown in FIG. 9) is to choose the minimum distance between new face 806 and all of the faces for a particular user. For example, in FIG. 10, block 1002 shows the various distances between face 806 and the various known face images. Thus, distances between face 806 and user 812's faces (block 1004) are 17, 30, and 12, respectively. Similarly, the distances between face 806 and user 808's faces (block 1006) are 15 and 27, respectively. In order to, for each user, one number to represent the distance between face 806 and that user, the minimum distance between face 806 and all of the faces for that user may be chosen. Thus, the lowest distance calculated between face 806 and any of the faces for user 812 is 12 (block 1008), and the lowest distance calculated between face 806 and any of the faces for user 808 is 15 (block 1010). Thus, block 1012 contains the final distances chosen to represent each user. In block 1012, distance 12 is chosen to represent the overall distance between face 806 and user 812, and distance 15 is chosen to represent the overall distance between face 806 and user 808. (Block 1014 contains a set of probabilities, which are described below. Additionally, it is noted that there may be additional user other than users 808 and 812; distances and/or probabilities associated with those users are represented by the ellipses in blocks 1002, 1012, and 1014.)

Figure 11:
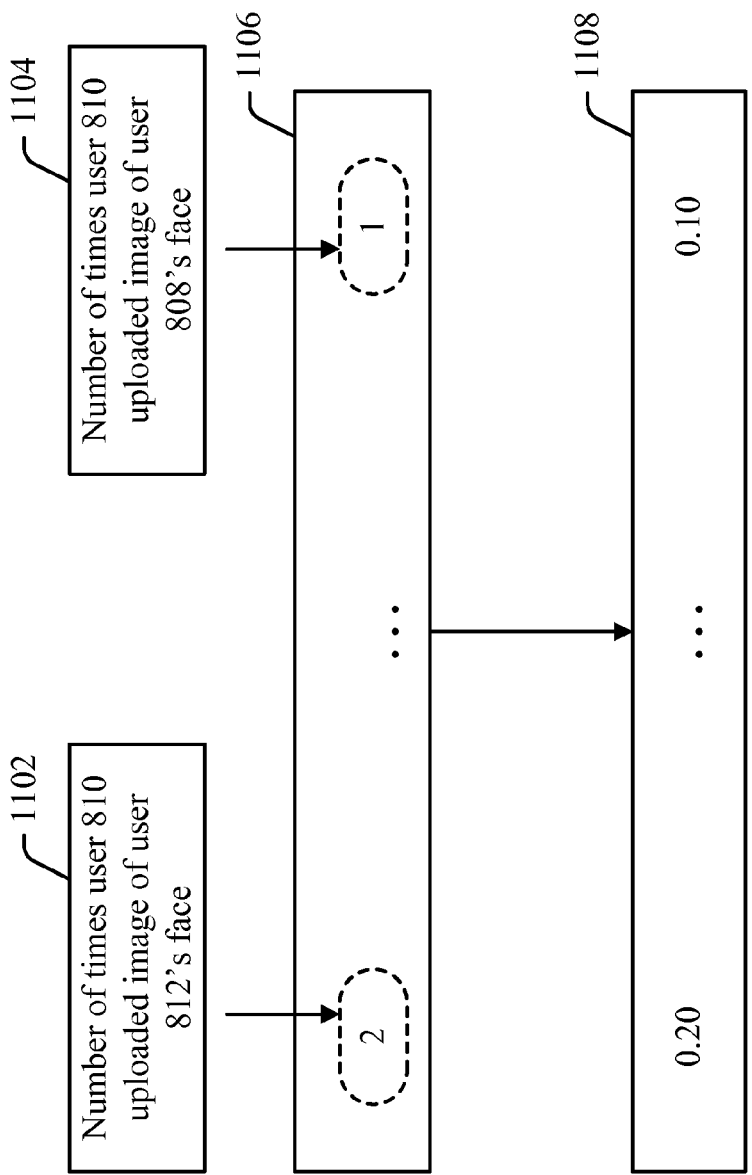

At 910, for each user a count is made of the number of times that the person who uploaded image 802 of new face 806 has uploaded an image of that user. For example, suppose that user 810 has uploaded image 802 of new face 806. As shown in FIG. 8, user 810 has, in the past, uploaded one image of user 808 and two images of user 812. These facts may be counted at 910, and the count may be recorded. FIG. 11 shows an example in which these counts are made. Block 1102 represents the number of times that user 810 has uploaded an image of user 812's face. Block 1104 represents the number of times that user 810 has uploaded an image of user 808's face. The final results are tabulated in block 1106. These results indicate that user 810 has uploaded user 812's face twice, and has uploaded user 808's face once. (As before, the ellipses may indicate results for users other than users 808 and 812.) Block 1108 contains a set of probabilities, which are discussed below.

At 912, a probability distribution is created based on the distance between face 806 and each user. At 914, a probability distribution is created based on the count of the number of times that the user who uploaded face 806 has uploaded images of those users. In other words, the distances and counts are converted into probability distributions, and the result of this conversion is the probability distributions shown in FIGS. 10 and 11 at blocks 1014 and 1108. In particular, the probability distribution in block 1014 shows the various probabilities that new face 806 is the face of each known user, based solely on the calculated distances between face 806 and each user. For example, as noted above, the distance between face 806 and user 812's faces is somewhat lower than the distance between face 806 and user 808's face. Thus—if one considers only the visual similarity between face 806 and users 808 and 812—it is slightly more likely that face 806 is user 812's face than user 808's face. The probability that face 806 is each of these user's faces may be calculated, and these probabilities may be put in an overall probability distribution. The probability distribution is, effectively, a probability mass function, in which each user is assigned a probability. The specific probabilities for users 812 and 808 are shown (0.15 and 0.10, respectively, in this example), and it is assumed that the ellipsis in block 1014 represents the probabilities of various other users. In one example, the probabilities are calculated by finding Exp(–distance) (the inverse of the natural exponential function of the distance) for each of the distances, and then multiplying the results by some constant in order to find the appropriate probability for each user. However, any appropriate method of calculating the probabilities could be used.

A probability mass function may also be calculated based on the number of times user 810 has uploaded images of other users. For example, as noted above, user 810 has uploaded twice as many images of user 812 and of user 808. If one considers only this fact, then—after making certain assumptions about how past behavior predicts future behavior—it is twice as likely that a future image uploaded by user 810 would be of user 812 rather than of user 808. Thus, in the example of FIG. 11, the probability that new face 806 is of user 812 is 0.20, and the probability that new face 806 is of user 810 is 0.10. Again, the ellipsis represents the probabilities that face 806 is of some other user. In general, for these probability mass functions, the higher the number of times that the one user has uploaded a photo of another, the higher the probability that that new photo is of that user; and, the higher the distance between a particular user and the new photo, the lower the probability is that the new photo is of that user.

Figure 12:
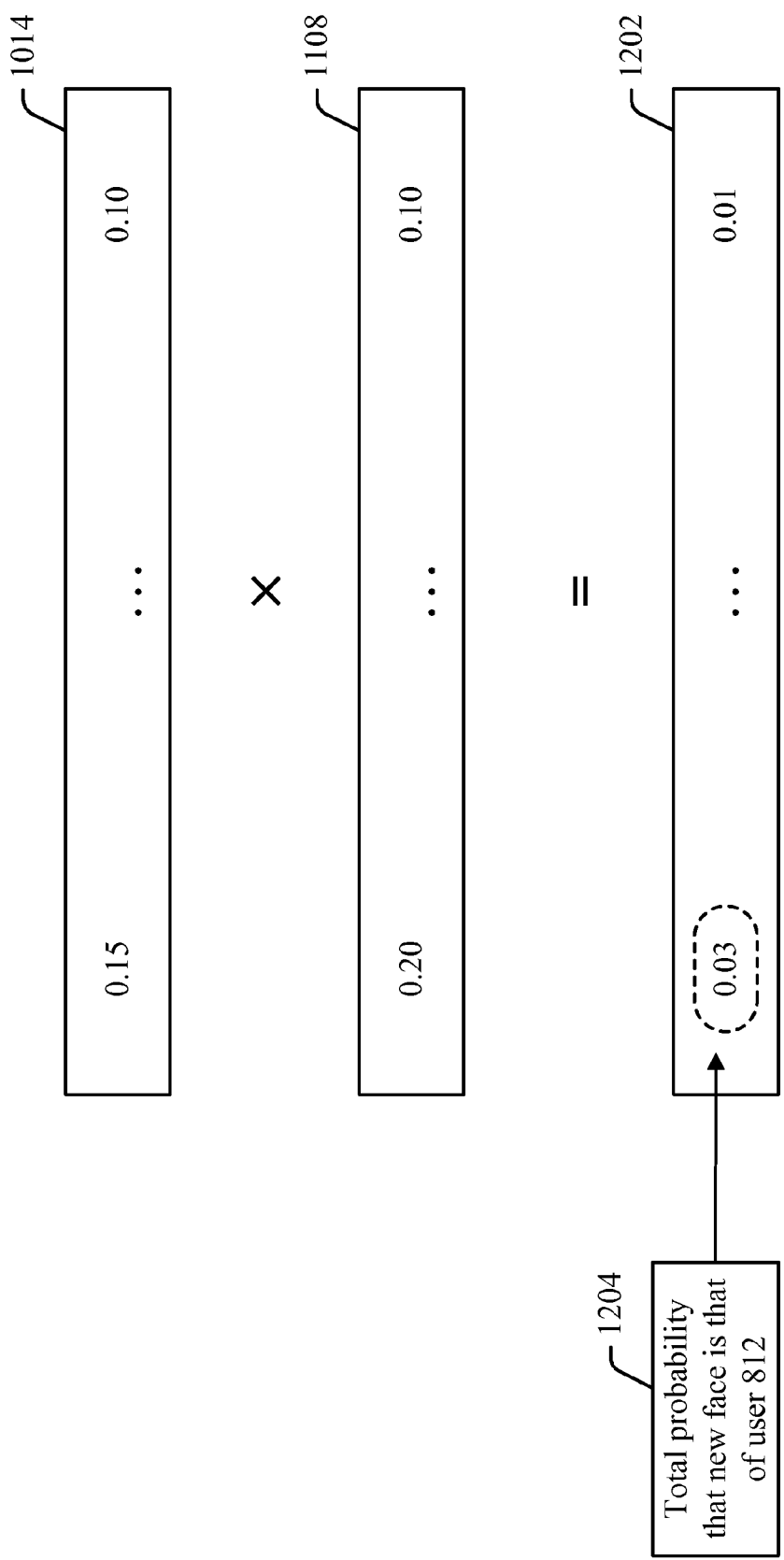

At 916, the two probability distributions are combined. The distributions may be combined in any manner, but one way to combine the distributions is to multiply the distributions together by multiplying the two probabilities associated with each user. An example of combining probabilities in this manner is shown in FIG. 12. In FIG. 12, the probabilities in block 1014 are multiplied together with the probabilities in block 1108, for each user. Thus, the probabilities associated with user 812 (0.15 and 0.20, as described above) are multiplied together to produce a probability of 0.03. The probabilities associated with user 808 (0.10 and 0.10) are multiplied together to produce a probability of 0.01. These probabilities are collected in block 1202, which represents the respective probabilities that new face 806 is the face of each user. For example, as indicated by block 1204, 0.03 represents the probability that the new face is the face of user 812. In the example of FIG. 12, the pairs of factors that are multiplied together are unweighted (i.e., are assigned equal weight). However, in another example, different weights could be assigned to the different factors. For example, the probabilities in block 1014 could be assigned a weight of two, and the probabilities in block 1108 could be assigned a weight of three, reflecting that these two probabilities may be assigned different relative significance in arriving at the final probabilities. (Two and three are merely examples of such weights; any weights could be used.)

Returning now to FIG. 9, at 918 the user associated with the highest probability is chosen as being user associated with the new face. For example, as shown in FIG. 12, user 812 has a 0.03 probability of being the user associated with the new face, and user 808 has a 0.01 probability of being the user associated with the new face. Since 0.03 is the highest of the probabilities shown (including, in the example of FIG. 12, the probabilities represented by the ellipsis in block 1202), user 812 is chosen as the user associated with the new face.

Figure 13:
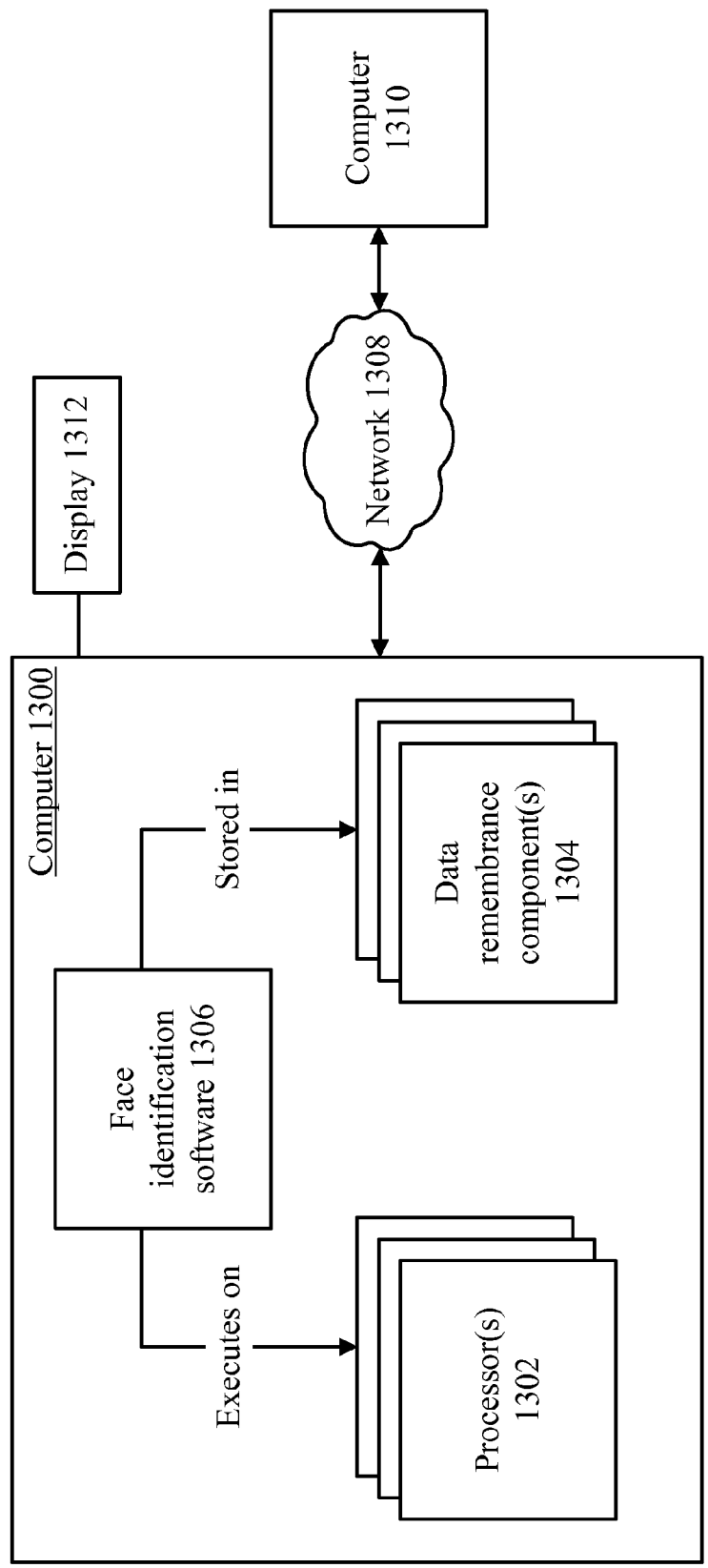
FIG. 13 is a block diagram of example components that may be used in connection with implementations of the subject matter described herein.

FIG. 13 shows an example environment in which aspects of the subject matter described herein may be deployed.

Computer 1300 includes one or more processors 1302 and one or more data remembrance components 1304. Processor(s) 1302 are typically microprocessors, such as those found in a personal desktop or laptop computer, a server, a handheld computer, or another kind of computing device. Data remembrance component(s) 1304 are components that are capable of storing data for either the short or long term. Examples of data remembrance component(s) 1304 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 1300 may comprise, or be associated with, display 1312, which may be a cathode ray tube (CRT) monitor, a liquid crystal display (LCD) monitor, or any other type of monitor.

Software may be stored in the data remembrance component(s) 1304, and may execute on the one or more processor(s) 1302. An example of such software is face identification software 1306, which may implement some or all of the functionality described above in connection with FIGS. 1-12, although any type of software could be used. Software 1306 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 13, although the subject matter described herein is not limited to this example.

The subject matter described herein can be implemented as software that is stored in one or more of the data remembrance component(s) 1304 and that executes on one or more of the processor(s) 1302. As another example, the subject matter can be implemented as instructions that are stored on one or more computer-readable storage media. (Tangible media, such as an optical disks or magnetic disks, are examples of storage media.) Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 1302) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 1300 may be communicatively connected to one or more other devices through network 1308. Computer 1310, which may be similar in structure to computer 1300, is an example of a device that can be connected to computer 1300, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media that store executable instructions to identify a first face, wherein the executable instructions, when executed by a computer, cause the computer to perform acts comprising:
    receiving, from a first user, a first image that contains said first face;
    for each of a plurality of second users, determining how many times said first user has uploaded images of said second users;
    for each of said plurality of second users, calculating distance metrics that represent visual differences between said first face and faces associated with said second users;
    based on how many times said first user has uploaded images of said second users, and also based on how different said first face is from faces associated with said second users, identifying a third user whom said first face is a picture of;
    tagging said first face as being a picture of said third user; and
    converting, into first probabilities, numbers of times that said first user has uploaded images of said second users, such that, for any pair of said second users, the user in said pair whose face has been uploaded by said first user a larger number of times has a higher probability of being the user that said first face is a picture of;
wherein said identifying of said third user is based on said first probabilities.

2. The one or more computer-readable storage media of claim 1, wherein said acts further comprise:
    converting said distance metrics into second probabilities, such that, for any pair of said second users, the user in said pair whose face has a higher distance to said first face has a lower probability of being the user that said first face is a picture of;
wherein said identifying of said third user is based on said second probabilities.

3. The one or more computer-readable storage media of claim 2, wherein said acts further comprise:
    calculating inverse exponentials of each of said distance metrics, and calculating said probabilities from said inverse exponentials.

4. The one or more computer-readable media of claim 1, there being second probabilities based on said distance metrics, and wherein said acts further comprise:
    combining said first probabilities and second probabilities to produce third probabilities;
wherein said third user is identified based on which of said second users is associated with a highest probability in said third probabilities.

5. The one or more computer-readable storage media of claim 4, wherein said first probabilities have a probability for each of said second users, wherein said second probabilities have a probability for each of said second users, and wherein said combining comprises:
  multiplying one of the first probabilities for a given user with one of the second probabilities for said given user.

6. The one or more computer-readable storage media of claim 5, wherein said acts further comprise:
  assigning a first weight to said first probabilities and a second weight to said second probabilities, wherein said first weight and said second weight are used in said multiplying.

7. The one or more computer-readable storage media of claim 1, said acts further comprising:
  performing geometric rectification and photometric rectification on said first image.

8. A method of identifying a first face, the method comprising:
  using a processor to perform acts comprising:
    receiving, from a first user, a first image that contains said first face;
    for each of a plurality of second users, determining how many times said first user has uploaded images of said second users;
    for each of said plurality of second users, calculating distance metrics that represent visual differences between said first face and faces associated with said second users;
    based on how many times said first user has uploaded images of said second users, and also based on how different said first face is from faces associated with said second users, identifying a third user whom said first face is a picture of;
    tagging said first face as being a picture of said third user; and
    converting, into first probabilities, numbers of times that said first user has uploaded images of said second users, such that, for any pair of said second users, the user in said pair whose face has been uploaded by said first user a larger number of times has a higher probability of being the user that said first face is a picture of;
  wherein said identifying of said third user is based on said first probabilities.

9. The method of claim 8, said acts further comprising:
  converting said distance metrics into second probabilities, such that, for any pair of said second users, the user in said pair whose face has a higher distance to said first face has a lower probability of being the user that said first face is a picture of;
  wherein said identifying of said third user is based on said second probabilities.

10. The method of claim 9, said acts further comprising:
  calculating inverse exponentials of each of said distance metrics, and calculating said probabilities from said inverse exponentials.

11. The method claim 8, there being second probabilities based on said distance metrics, said acts further comprising:
  combining said first probabilities and second probabilities to produce third probabilities;
  wherein said third user is identified based on which of said second users is associated with a highest probability in said third probabilities.

12. The method of claim 11, said first probabilities having a probability for each of said second users, wherein said second probabilities have a probability for each of said second users, and wherein said combining comprises:
  multiplying one of the first probabilities for a given user with one of the second probabilities for said given user.

13. The method of claim 12, said acts further comprising:
  assigning a first weight to said first probabilities and a second weight to said second probabilities, wherein said first weight and said second weight are used in said multiplying.

14. The method of claim 8, said acts further comprising:
  performing geometric rectification and photometric rectification on said first image.

15. A system for identifying a first face, the system comprising:
  a memory;
  a processor; and
  a component that is stored in said memory and that executes on said processor, said component receiving, from a first user, a first image that contains said first face, said component, for each of a plurality of second users, determining how many times said first user has uploaded images of said second users, said component, for each of said plurality of second users, calculating distance metrics that represent visual differences between said first face and faces associated with said second users, said component identifying, based on how many times said first user has uploaded images of said second users, and also based on how different said first face is from faces associated with said second users, a third user whom said first face is a picture of, said component tagging said first face as being a picture of said third user, and said component converting, into first probabilities, numbers of times that said first user has uploaded images of said second users, such that, for any pair of said second users, the user in said pair whose face has been uploaded by said first user a larger number of times has a higher probability of being the user that said first face is a picture of, said identifying of said third user being based on said first probabilities.

16. The system of claim 15, said component converting said distance metrics into second probabilities, such that, for any pair of said second users, the user in said pair whose face has a higher distance to said first face has a lower probability of being the user that said first face is a picture of;
  wherein said identifying of said third user is based on said second probabilities.

17. The system of claim 16, said component calculating inverse exponentials of each of said distance metrics, and calculating said probabilities from said inverse exponentials.

18. The system of claim 15, there being second probabilities based on said distance metrics, said component combining said first probabilities and second probabilities to produce third probabilities, said third user being identified based on which of said second users is associated with a highest probability in said third probabilities.

19. The system of claim 18, said first probabilities having a probability for each of said second users, wherein said second probabilities have a probability for each of said second users, said component performing said combining by multiplying one of the first probabilities for a given user with one of the second probabilities for said given user.

20. The system of claim 19, said component assigning a first weight to said first probabilities and a second weight to said second probabilities, wherein said first weight and said second weight are used in said multiplying.

* * * * *